United States Patent
Sawatari et al.

(10) Patent No.: US 7,867,580 B2
(45) Date of Patent: *Jan. 11, 2011

(54) LIQUID CRYSTAL DISPLAY

(75) Inventors: Naoko Sawatari, Tokyo (JP); Masato Okabe, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 341 days.

This patent is subject to a terminal disclaimer.

(21) Appl. No.: 10/588,825

(22) PCT Filed: Feb. 9, 2005

(86) PCT No.: PCT/JP2005/001951

§ 371 (c)(1),
(2), (4) Date: Aug. 9, 2006

(87) PCT Pub. No.: WO2005/076059

PCT Pub. Date: Aug. 18, 2005

(65) Prior Publication Data

US 2008/0124493 A1 May 29, 2008

(30) Foreign Application Priority Data

Feb. 10, 2004 (JP) .............................. 2004-033292

(51) Int. Cl.
C09K 19/00 (2006.01)
C09K 19/06 (2006.01)
C09K 19/52 (2006.01)
G02F 1/1333 (2006.01)

(52) U.S. Cl. .................... 428/1.1; 428/1.2; 428/1.3; 430/20; 252/299.01; 252/299.6

(58) Field of Classification Search ............ 252/299.01, 252/299.6; 428/1.1–1.3; 430/20
See application file for complete search history.

(56) References Cited

U.S. PATENT DOCUMENTS

| | | | |
|---|---|---|---|
| 4,783,148 A | 11/1988 | Tsuboyama et al. | |
| 5,155,610 A | 10/1992 | Hikmet et al. | |
| 5,602,661 A | 2/1997 | Schadt et al. | |
| 5,617,229 A | 4/1997 | Yamamoto et al. | |
| 7,326,449 B2 | 2/2008 | Geisow et al. | |
| 7,402,332 B2 * | 7/2008 | Sawatari et al. | 428/1.3 |
| 7,499,135 B2 * | 3/2009 | Okabe et al. | 349/135 |
| 2002/0085153 A1 | 7/2002 | Choi et al. | |
| 2003/0021913 A1 | 1/2003 | O'Neill et al. | |
| 2003/0156243 A1 | 8/2003 | Yoshihara et al. | |
| 2005/0233094 A1 * | 10/2005 | Sawatari et al. | 428/1.1 |
| 2006/0082719 A1 * | 4/2006 | Okabe et al. | 349/172 |

FOREIGN PATENT DOCUMENTS

| | | |
|---|---|---|
| EP | 0 659 865 | 12/1994 |
| JP | 62-182719 A | 8/1987 |
| JP | 62-275223 A | 11/1987 |
| JP | 01-105912 A | 4/1989 |
| JP | 4-234018 A | 8/1992 |
| JP | 5-80341 | 4/1993 |
| JP | 7-64051 A | 3/1995 |
| JP | 7-239485 A | 9/1995 |
| JP | 2000-010076 A | 1/2000 |
| JP | 2001-48904 | 2/2001 |
| JP | 2002-532755 | 10/2002 |
| JP | 2003-172935 | 6/2003 |
| WO | 02/03131 A1 | 1/2002 |

OTHER PUBLICATIONS

Hikmet, R. A. M. et al (1995) Effect of the Orientation of the Ester on the Properties of Three Isomeric Liquid Crystal Diacrylates before and after Polymerization. XP008054766.

Hikmet, R. A. M. et al (1992) Structure and Mobility within Anisotropic Networks Obtained by Photopolymerization of Liquid Crystal Molecules. XP-002435470.

Nonaka, T., et al. (1999) Material characteristics of an active matrix LCD based upon chiral smectics. Liquid Crystals. 26:1599-1602.

Patel, J., et al. (1986) Alignment of liquid crystals which exhibit cholesteric to smectic C* phase transitions. J. Appl. Phys. 59:2355-2360.

Yuji Murakami, et al; "Intrinsic Half-V-Mode Ferroelectric Liquid Crystal Displays Fabricated Using Hybrid Alignment Exhibiting High Contrast Ratio and High Reliability without DC Voltage Application to Remove Layer Degeneracy and Their Electro-Optic Characteristics", Jpn. J. Appl. Phys., vol. 42, Part 1, No. 5A, May 2003 (exact date not given on publication), pp. 2759-2761.

Yuji Murakami, et al; "Intrinsic Half-V-Mode Ferroelectric Liquid Crystal Displays Fabricated Using Hybrid Alignment Exhibiting High Contrast Ratio and High Reliability without DC Voltage Application to Remove Layer Degeneracy and Their Electro-Optic Characteristics", Jpn. J. Appl. Phys., vol. 42, Part 1, No. 5A, May 2003 (exact date not given on publication), pp. 2759-2761.

* cited by examiner

Primary Examiner—Geraldina Visconti
(74) Attorney, Agent, or Firm—Ladas & Parry LLP

(57) ABSTRACT

A liquid crystal display which can give mono-domain alignment of the ferroelectric liquid crystal without forming alignment defects. The liquid crystal display has a UV curable liquid crystal side substrate having a first substrate, an electrode layer formed on the first substrate, a first alignment layer formed on the electrode layer, and a UV curable liquid crystal layer with a UV curable liquid crystal fixed and formed on the first alignment layer; and a counter substrate having a second substrate, an electrode layer formed on the second substrate, and a second alignment layer formed on the electrode layer. The UV curable liquid crystal layer of the UV curable liquid crystal side substrate and the second alignment layer of the counter substrate are disposed so as to face each other such that a ferroelectric liquid crystal is sandwiched between the UV curable liquid crystal side substrate and the counter substrate.

19 Claims, 4 Drawing Sheets

BRIGHT

DARK

LIQUID CRYSTAL DISPLAY

TECHNICAL FIELD

The present invention relates to a liquid crystal display with the alignment of the ferroelectric liquid crystal controlled.

BACKGROUND ART

Since liquid crystal displays have features that it is thin and is low in power consumption and other features, the use thereof has been expanding in various articles from large-sized displays to portable information terminals and the development thereof has been actively made. Conventionally, for liquid crystal displays, a TN system, an STN multiplex driving system, an active matrix driving system in which thin film transistors (TFTs) are used in TN, and others have been developed and made practicable. However, since nematic liquid crystal is used therein, the response speed of the liquid crystal material is as small as several milliseconds to several tens of milliseconds and it cannot be said that these sufficiently cope with display of moving images.

Ferroelectric liquid crystal (FLC) exhibits a very fast response in order of microseconds, and thus FLC is a liquid crystal suitable for high-speed devices. About ferroelectric liquid crystal, there is well known a bistable liquid crystal which has two stable states when no voltage is applied thereto and is suggested by Clark and Lagerwall (FIG. 3). However, the liquid crystal has a problem that the liquid crystal has memory property but gray scale display cannot be attained. This is because the switching is limited to two states, namely, bright and dark states.

In recent years, attention has been paid to ferroelectric liquid crystal in which the liquid crystal layer thereof is stable in a single state (hereinafter referred to as "monostable") when no voltage is applied thereto as a liquid crystal making it possible to attain gray scale display by the matter that the director (the inclination of the molecule axis) of the liquid crystal is continuously changed by a change in applied voltage so as to analogue-modulate the light transmission thereof (non-patent document 1, FIG. 3). As such liquid crystal exhibiting mono-stability, there is usually used a ferroelectric liquid crystal in which phase change is caused between cholesteric phase (Ch) and chiral smectic C phase (SmC*) via no smectic A phase (5 mA).

Ferroelectric liquid crystal has a higher order of molecules therein than nematic liquid crystal; therefore, the former liquid crystal is not easily aligned so that defects called zigzag defects or hairpin defects are easily generated. Such defects cause a fall in contrast based on light leakage. In particular, ferroelectric liquid crystal undergoing phase transition via no 5 mA phase generates two domains different in the layer normal-line direction thereof (hereinafter referred to as "double domains") (FIG. 4). The double domains give such display that black and white are reversed when driven so as to cause a serious problem (FIG. 5). As the method for improving the double domains, known is an electric field induced technique (, which uses DC voltage during cooling process) of heating a liquid crystal cell to a temperature not lower than the cholesteric phase thereof, and then cooling the liquid crystal cell slowly while applying a DC voltage thereto (non-patent document 2). This method has problems such as that the alignment of the liquid crystal is disturbed when the temperature thereof is again raised to a temperature not lower than the phase transition temperature thereof and the alignment is disturbed in regions where no electric field acts between pixel electrodes.

As the technique for subjecting liquid crystal to alignment treatment, there is known a method of using an alignment layer. The method is classified into the rubbing method and the photo alignment method. The rubbing method is a method of subjecting a substrate coated with a polyimide film to rubbing treatment to align chains of the polyimide polymer in the direction of the rubbing, thereby aligning liquid crystal molecules on the film. The rubbing method is excellent in controllability of the alignment of nematic liquid crystal, and is generally an industrially applicable technique. Moreover, the photo alignment method is for aligning the liquid crystal molecule of the film by directing a light beam with the polarization controlled to a polymer or a monomolecule for generating the photo excitation reaction (decomposition, isomerization, dimerization) so as to provide the anisotropy to the polymer film. However, with either of the methods, it is difficult to restrain generation of the double domains, and thus it is difficult to obtain the mono domain alignment.

Moreover, although it does not provide the mono-stability, as a method for improving the alignment defect of the ferroelectric liquid crystal, the patent document 1 discloses a method for aligning the ferroelectric liquid crystal by forming a nematic liquid crystal layer by coating, aligning and fixing a nematic liquid crystal on each alignment layer after applying the photo alignment treatment to upper and lower alignment layers, and functioning the nematic liquid crystal layers as an alignment layer. However, this method is not for restraining generation of the alignment defect of the ferroelectric liquid crystal having the mono-stability, and thus a method for improving the double domains is not described.

On the other hand, in recent years, full-color liquid crystal displays have been actively developed. The method for realizing color display is generally classified into a color filter system and a field sequential color system. The color filter system is a system of using a white light source as a back light and attaching a micro color filter in R, G or B color to each pixel, thereby realizing color display. On the other hand, the field sequential color system is a system of switching a back light into R, G, B, R, G, B . . . with time, and opening and shutting a black and white shutter of a ferroelectric liquid crystal in synchronization therewith to mix the colors with time by afterimage effect on the retina, thereby realizing color display. This field sequential color system makes it possible to attain color display in each pixel, and does not require any color filter low in transmission. As a result, this system is useful since the system is capable of attaining highly precise color display and realizing low power consumption and low costs. However, the field sequential color system is a system in which each pixel is subjected to time sharing; it is therefore necessary for the liquid crystal as the black and white shutter to have high-speed responsiveness in order to give a good moving image display property. If ferroelectric liquid crystal is used, this problem can be solved. However, the ferroelectric liquid crystal has a problem that alignment defects are easily generated, as described above, and thus the color system using this liquid crystal has not been made practicable.

Patent document 1: Japanese Patent Publication No. 2002-532755

Non-patent document 1: NONAKA, T., LI, J., OGAWA, A., HORNUNG, B., SCHMIDT, W., WINGEN, R., and DUBAL, H., 1999, Liq. Cryst., 26, 1599.

Non-patent document 2: PATEL, J., and GOODBY, J. W., 1986, J. Appl. Phys., 59, 2355

DISCLOSURE OF INVENTION

Problem to be Solved by the Invention

A main object of the present invention is to provide liquid crystal display using a ferroelectric liquid crystal, which can give mono-domain alignment of the ferroelectric liquid crystal without forming alignment defects such as double domains and which are so remarkably good in alignment stability that the alignment thereof can be maintained even if the temperature of the liquid crystal is raised to the phase transition point or higher.

Means for Solving the Problem

In order to achieve the above-mentioned object, the present invention provides a liquid crystal display comprising: a UV curable liquid crystal side substrate having a first substrate, an electrode layer formed on the first substrate, a first alignment layer formed on the electrode layer, and a UV curable liquid crystal layer with a UV curable liquid crystal fixed and formed on the first alignment layer; and a counter substrate having a second substrate, an electrode layer formed on the second substrate, and a second alignment layer formed on the electrode layer, wherein the UV curable liquid crystal layer of the UV curable liquid crystal side substrate and the second alignment layer of the counter substrate are disposed so as to face each other such that a ferroelectric liquid crystal is sandwiched between the UV curable liquid crystal side substrate and the counter substrate.

According to the present invention, since the UV curable liquid crystal layer is formed by fixing a UV curable liquid crystal aligned by the first alignment layer, it can function as an alignment layer for aligning the ferroelectric liquid crystal. Moreover, since the UV curable liquid crystal has a structure relatively similar to that of the ferroelectric liquid crystal, the interaction with the ferroelectric liquid crystal can be reinforced so that the alignment of the ferroelectric liquid crystal can be controlled more effectively compared with the case of using only the alignment layer. Therefore, since the UV curable liquid crystal layer is formed on the first alignment layer, generation of the alignment defects such as the double domains can be restrained so that the mono domain alignment of the ferroelectric liquid crystal can be obtained. Since the present invention is a liquid crystal display in which the alignment layers and UV curable liquid crystal layer are used to conduct alignment treatment without depending on the electric field induced technique, (which uses DC voltage during cooling process), the invention has an advantage that even if the temperature thereof is raised to the phase transition point or higher, the alignment of the liquid crystal can be maintained so as to restrain alignment defects such as double domains from being generated.

Moreover, according to the present invention, a second UV curable liquid crystal layer formed by fixing a UV curable liquid crystal may be formed on the above-mentioned second alignment layer. In this case, it is preferable that the UV curable liquid crystal for providing the above-mentioned UV curable liquid crystal layer and the UV curable liquid crystal for providing the above-mentioned second UV curable liquid crystal layer have different compositions. As mentioned above, the UV curable liquid crystal can control the alignment of the ferroelectric liquid crystal more effectively compared with the case of using only the alignment layer. Moreover, since the UV curable liquid crystal for providing the above-mentioned UV curable liquid crystal layer and the UV curable liquid crystal for providing the above-mentioned second UV curable liquid crystal layer have different compositions, generation of the alignment defects such as the double domains can be restrained so that the mono domain alignment of the ferroelectric liquid crystal can be obtained.

In the above-mentioned invention, it is preferable that the above-mentioned UV curable liquid crystal shows a nematic phase. The nematic phase allows the alignment control relatively easily among the liquid crystal phases.

Moreover, according to the above-mentioned invention, it is preferable that the above-mentioned UV curable liquid crystal has a polymerizable liquid crystal monomer. Compared with the other polymerizable liquid crystal materials, that is, a polymerizable liquid crystal oligomer and a polymerizable liquid crystal polymer, the polymerizable liquid crystal monomer can be aligned at a lower temperature and it has a high alignment sensitivity so that it can be aligned easily.

Furthermore, according to the above-mentioned invention, it is preferable that the above-mentioned polymerizable liquid crystal monomer is a monoacrylate monomer or a diacrylate monomer. The monoacrylate monomer or the diacrylate monomer can easily be polymerized while preferably maintaining the aligned state.

Still further, according to the above-mentioned invention, it is preferable that the above-mentioned diacrylate monomer is a compound represented by the below-mentioned formula (1):

[Chemical formula 1]

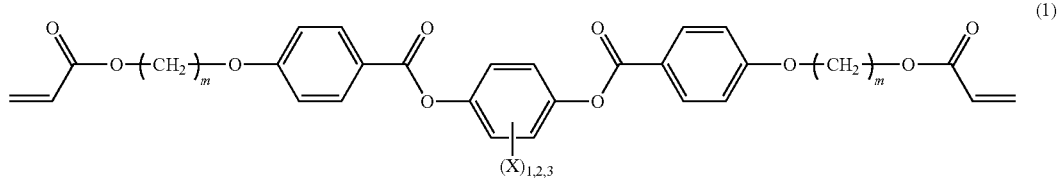

(Here, X in the formula is a hydrogen, an alkyl having 1 to 20 carbon atoms, an alkenyl having 1 to 20 carbon atoms, an alkyloxy having 1 to 20-carbon atoms, an alkyloxy carbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro; and m is an integer in a range of 2 to 20.)

Furthermore, according to the above-mentioned invention, it is preferable that the above-mentioned diacrylate monomer is a compound represented by the below-mentioned formula (2):

[Chemical formula 2]

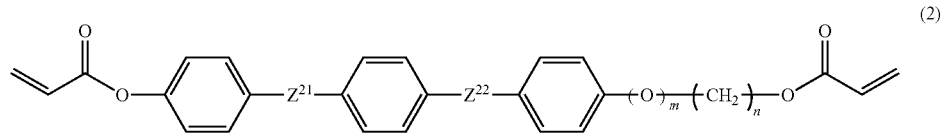

(2)

(Here, $Z^{21}$ and $Z^{22}$ in the formula are each independently directly bonded —COO—, —OCO—, —O—, —CH$_2$CH$_2$—, —CH=CH—, —C≡C—, —OCH$_2$—, —CH$_2$O—, —CH$_2$CH$_2$COO— or —OCOCH$_2$CH$_2$—; m is 0 or 1; and n is an integer in a range of 2 to 8.)

Moreover, according to the present invention, it is preferable that the above-mentioned first alignment layer and the above-mentioned second alignment layer are a photo alignment layer respectively. Since the photo alignment treatment at the time of forming a photo alignment layer is a non contact alignment treatment, it is effective in that the quantitative alignment treatment can be controlled without generation of the static electricity or the dusts.

Still further, in the present invention, it is preferable that the above-mentioned ferroelectric liquid crystal shows mono-stability. Since the one showing the mono-stability is used as the ferroelectric liquid crystal, it can be used effectively for the various applications.

Moreover, in the present invention, it is preferable that the above-mentioned ferroelectric liquid crystal does not have a smectic A phase in its phase sequence. As mentioned above, although a ferroelectric liquid crystal not having a smectic A phase in the phase sequence can easily generate an alignment defect such as the double domains, since the ferroelectric liquid crystal is sandwiched between the UV curable liquid crystal layer and the second alignment layer, generation of the alignment defect such as the double domains can be restrained so that a remarkable effect can be provided by using it in the present invention.

Still furthermore, the ferroelectric liquid crystal is preferably a ferroelectric liquid crystal which constitutes a single phase. In the liquid crystal display of the invention, a good alignment can be obtained even if the single-phase ferroelectric liquid crystal is used. Therefore, it is unnecessary to use the polymer stabilization method or the like to control the alignment. Thus, the invention has advantages that the process for the production of the display becomes simple and the driving voltage thereof can be made low.

The liquid crystal display of the present invention is preferably a display driven by an active matrix system using a thin film transistor (TFT). This is because the adoption of the active matrix system using TFT element makes it possible to switch on or off target pixels surely to give high-quality display. Furthermore, it is possible to combine a TFT substrate, in which TFT elements are arranged in a matrix form on one of the substrates, with a common electrode substrate, in which a common electrode is formed in the whole of the display section of the other substrate, to form a micro color filter wherein TFT elements are arranged in a matrix form between the common electrode of the common electrode substrate and the substrate thereof, and use the resultant as a color liquid crystal display.

The liquid crystal display of the present invention is preferably a liquid crystal display displayed by a field sequential color system for the following reason: the liquid crystal display has fast switching speed and makes it possible to align the ferroelectric liquid crystal therein without forming any alignment defect; therefore, when the liquid crystal display is displayed by the field sequential color system, highly precise display of full-color moving images which has a wide field angle can be realized.

EFFECT OF THE INVENTION

The liquid crystal display of the invention provides the following effects: the liquid crystal display makes it possible to align the ferroelectric liquid crystal therein without forming alignment defects such as zigzag defects, hairpin defects or double domains, and further the liquid crystal display is a liquid crystal display so remarkably good in alignment stability that the alignment is not easily disturbed even if the temperature thereof is raised to the phase transition point thereof or higher.

Figure 1:
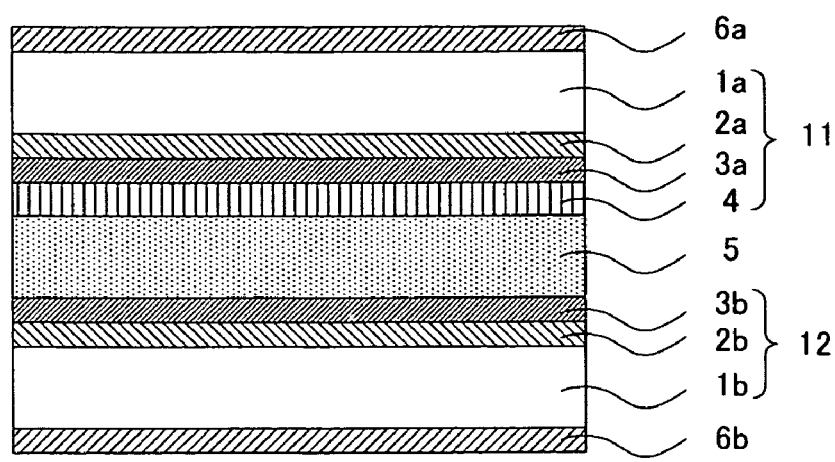
FIG. 1 is a schematic sectional view illustrating one example of the liquid crystal display of the present invention.

DESCRIPTION OF THE REFERENCE NUMERALS 1a first substrate
1b second substrate
2a, 2b electrode layer
3a first alignment layer
3b second alignment layer
4 UV curable liquid crystal layer
5 liquid crystal layer
6a, 6b polarizing plate 11 UV curable liquid crystal side substrate
12 counter substrate

BEST MODE FOR CARRYING OUT THE INVENTION

Hereinafter, the liquid crystal display of the present invention will be described in further detail.

A liquid crystal display of the present invention comprises: a UV curable liquid crystal side substrate having a first substrate, an electrode layer formed on the first substrate, a first alignment layer formed on the electrode layer, and a UV curable liquid crystal layer with a UV curable liquid crystal fixed and formed on the first alignment layer; and a counter substrate having a second substrate, an electrode layer formed on the second substrate, and a second alignment layer formed on the electrode layer, wherein the UV curable liquid crystal layer of the UV curable liquid crystal side substrate and the second alignment layer of the counter substrate are disposed so as to face each other such that a ferroelectric liquid crystal is sandwiched between the UV curable liquid crystal side substrate and the counter substrate.

Such a liquid crystal display of the present invention will be explained with reference to the drawings. FIG. 1 is a schematic cross-sectional view showing an example of a liquid crystal display of the present invention. As it is shown in FIG. 1, the liquid crystal display of the present invention comprises: a UV curable liquid crystal side substrate 11 having a first substrate 1a, an electrode layer 2a formed on the first substrate 1a, a first alignment layer 3a formed on the electrode layer 2a, and a UV curable liquid crystal layer 4 formed on the first alignment layer 3a; and a counter substrate 12 having a second substrate 1b, an electrode layer 2b formed on the second substrate 1b, and a second alignment layer 3b formed on the electrode layer 2b. Furthermore, a ferroelectric liquid crystal is sandwiched between the UV curable liquid crystal layer 4 of the UV curable liquid crystal side substrate 11 and the second alignment layer 3b of the counter substrate 12 so as to provide a liquid crystal layer 5.

Moreover, since the UV curable liquid crystal layer 4 is formed on the first alignment layer 3a, the UV curable liquid crystal comprising the UV curable liquid crystal layer 4 is aligned by the above-mentioned first alignment layer 3a so that the UV curable liquid crystal layer 4 is formed by fixing the aligned state of the UV curable liquid crystal by polymerizing the UV curable liquid crystal by for example polymerization with an ultraviolet ray.

Accordingly, since the UV curable liquid crystal layer 4 has the aligned state of the UV curable liquid crystal fixed, it has the function as an alignment layer for aligning the ferroelectric liquid crystal comprising the liquid crystal layer 5. Furthermore, since the UV curable liquid crystal comprising the UV curable liquid crystal layer has a structure relatively similar to that of the ferroelectric liquid crystal, the interaction with the ferroelectric liquid crystal can be reinforced so that the alignment can be controlled more effectively than the case of using only an alignment layer.

According to the liquid crystal display of the present invention, since the UV curable liquid crystal layer is formed on one of the upper and lower alignment layers, the effect of aligning the ferroelectric liquid crystal without forming the alignment defects such as the double domains can be achieved. Since the present invention is a liquid crystal display in which the alignment layers and UV curable liquid crystal layer are used to conduct alignment treatment without depending on the electric field induced technique (, which uses DC voltage during cooling process), the invention has an advantage that even if the temperature thereof is raised to the phase transition point thereof or higher, the alignment of the liquid crystal can be maintained so as to restrain alignment defects such as double domains from being generated.

Furthermore, in the liquid crystal display of the present invention, for example as shown in FIG. 1, polarizing plates 6a and 6b may be formed outside of the first and second substrates 1a and 1b. This makes it possible to convert incident light into linear polarized light so that the display can transmit only light polarized in the alignment direction of the liquid crystal molecules. The polarizing plates 6a and 6b are arranged in such a manner that the polarization direction thereof is twisted at 90°. This makes it possible to control the direction of the optical axis of the liquid crystal molecules or the magnitude of the birefringence of the liquid crystal molecules between states that voltage is not applied thereto and is applied thereto, and to produce a bright state and a dark state by use of the ferroelectric liquid crystal molecules as a black and white shutter. For example, in the state that no voltage is applied, the light transmitted through the polarizing plate 6a cannot be caused to rotate its polarization direction at an angle of 90° by setting the polarizing plate 6a to make consistent with the alignment of the liquid crystal molecules. Consequently, this light is blocked by the polarizing plate 6b so that the liquid crystal is turned into a dark state. On the other hand, in the voltage applied state, by disposing the alignment of the liquid crystal molecules with an angle of θ (preferably θ=45°) with respect to the polarizing plates 6a, 6b, the light polarizing direction is twisted by 90° by the liquid crystal molecules so as to transmit the polarizing plate 6b for providing the bright state. Accordingly, since the liquid crystal display of the invention utilizes the ferroelectric liquid crystal as a black and white shutter, the response speed can be made faster, and thus it is advantageous.

Figure 2:
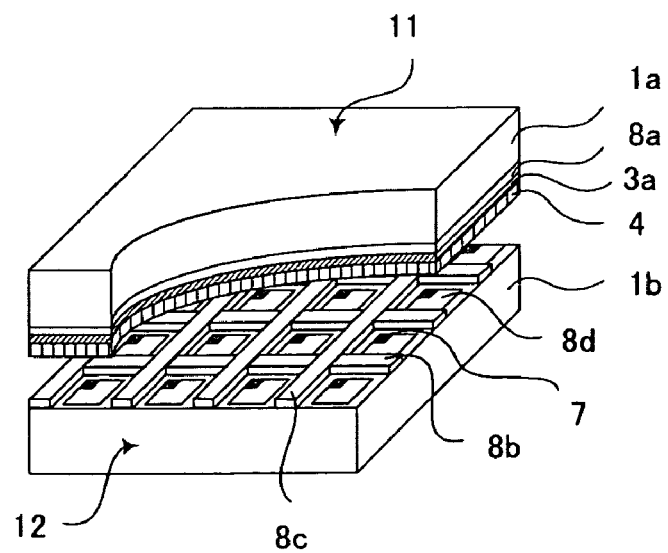
FIG. 2 is a schematic perspective view illustrating one example of the liquid crystal display of the present invention.
Figure 3:
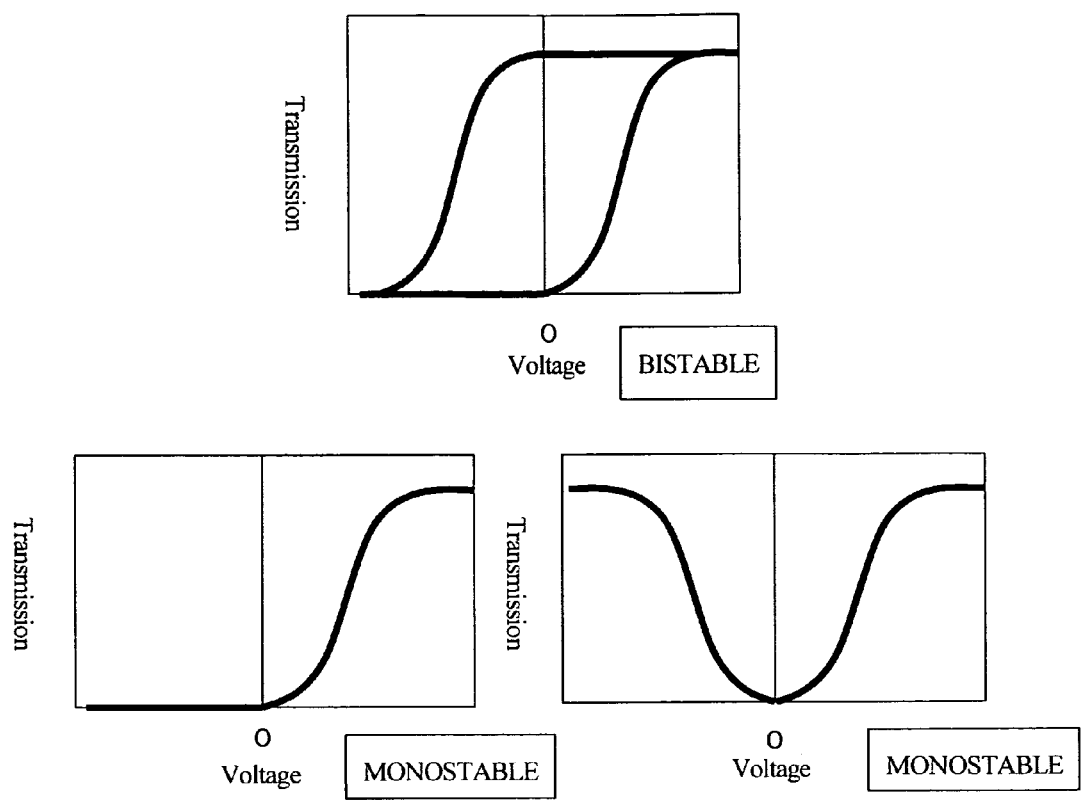
FIG. 3 is a graph showing changes in transmission as a function of voltage applied to ferroelectric liquid crystals.
Figure 4:
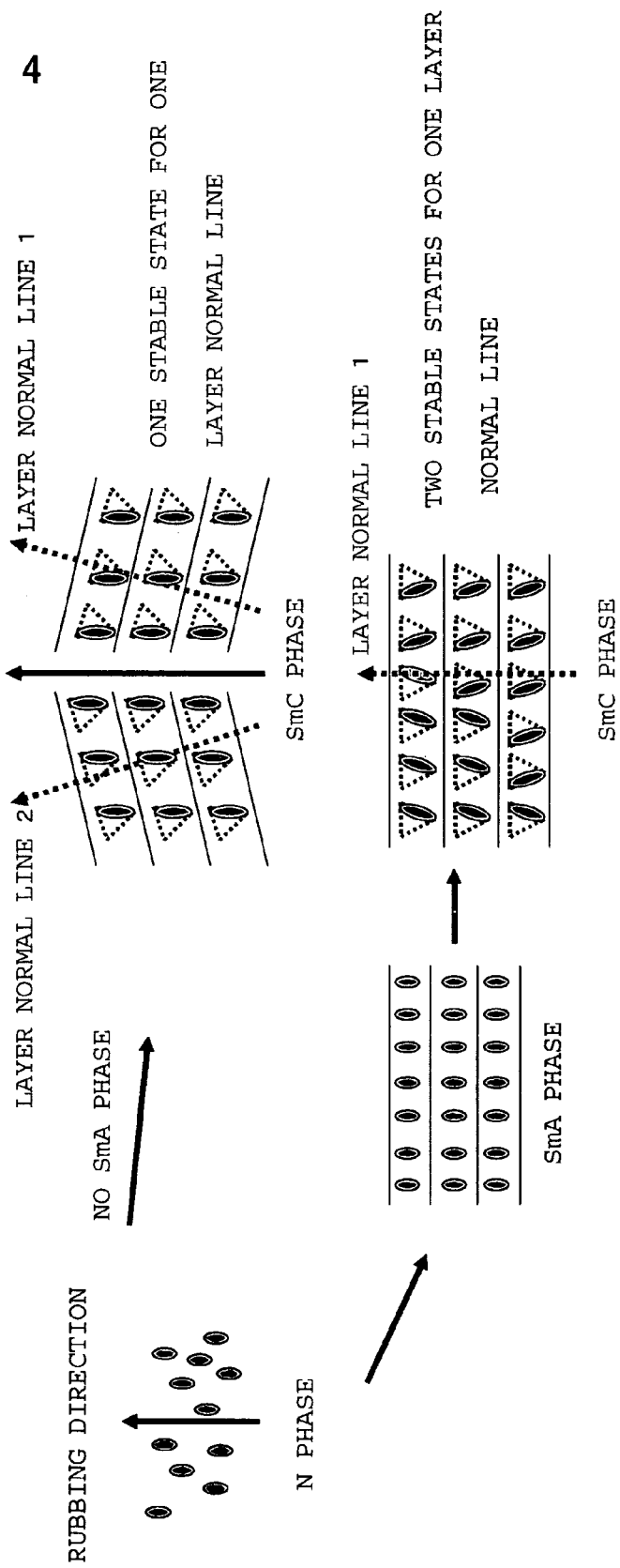
FIG. 4 is a view illustrating a difference of alignment defects based on a difference of the phase series that ferroelectric liquid crystal has.
Figure 5:
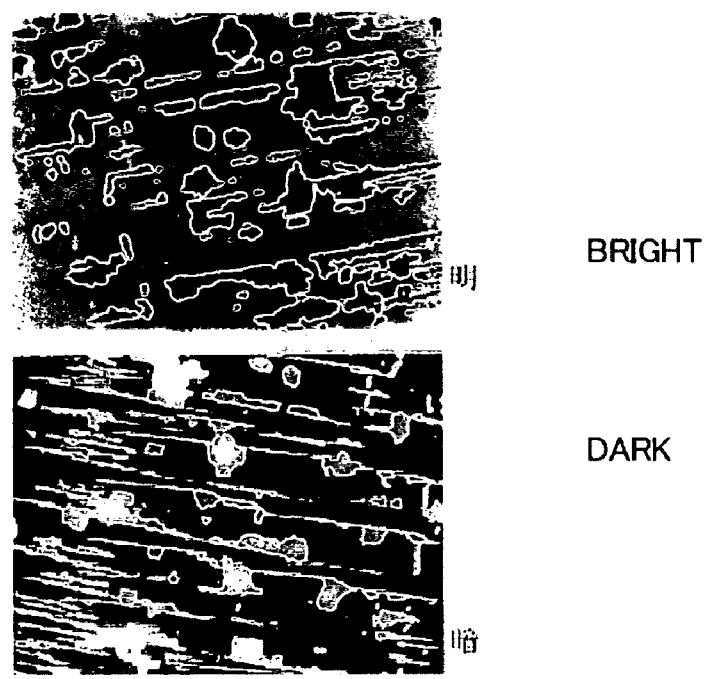
FIG. 5 is a photograph showing double domains which are alignment defects of ferroelectric liquid crystal.

As shown in, for example, FIG. 2, the liquid crystal display of the present invention is preferably a display in which the counter substrate 12 is rendered a TFT substrate in which thin film transistors (TFTs) 7 are arranged in a matrix form, the UV curable liquid crystal side substrate 11 is rendered a common electrode substrate having the common electrode 8a formed on the whole area thereof, and the two substrates are combined with each other. Such liquid crystal display of an active matrix system using TFT elements will be described hereinafter.

In FIG. 2, in the UV curable liquid crystal side substrate 11, its electrode layer is the common electrode 8a, and thus the UV curable liquid crystal side substrate 11 is a common electrode substrate. On the other hand, in the counter substrate 12, its electrode layer is composed of the x electrodes 8b, the y electrodes 8c and the pixel electrodes 8d, and thus the substrate is a TFT substrate. In this liquid crystal display, the electrodes 8b and the y electrodes 8c are arranged lengthwise and crosswise, respectively. When signals are added to these electrodes, the TFT elements 7 are worked so as to drive the ferroelectric liquid crystal. Regions where the x electrodes 8b and the y electrodes 8c cross are insulated with an insulator layer, which is not illustrated. Signals to the x electrodes 8b and signals to the y electrodes 8c can be independently operated. Any region surrounded by the x electrodes 8b and the y electrodes 8c is a pixel, which is a minimum unit for driving the liquid crystal display of the invention. At least one out of the TFT elements 7 and at least one out of the pixel electrodes 8d are fitted to each of the pixels. In the liquid crystal display of the invention, the TFT elements 7 of the respective pixels can be worked by applying signal voltages successively to the x electrodes 8b and the y electrodes 8c. In FIG. 2, a liquid crystal layer and a second alignment layer are omitted.

Furthermore, the liquid crystal display of the invention can be used as a color display by forming a micro color filter in which TFT elements are arranged in a matrix form between the common electrode 8a and the first substrate 1a. Each of the constituent members of the liquid crystal display of the invention, as described above, will be described in detail hereinafter.

Although the side with the common electrode 8a formed is the UV curable liquid crystal side substrate 11 and the side with the TFT elements 7 and the pixel electrodes 8d, or the like formed is the counter substrate 12 in FIG. 2, the liquid crystal display of the present invention is not limited to such a configuration. The side with the common electrode formed may be the counter substrate and the side with the TFT elements, the pixel electrodes, or the like may be the UV curable liquid crystal side substrate.

The constituent members of such a liquid crystal display of the present invention will each be explained in detail hereinafter.

1. Constituent Members for the Liquid Crystal Display (1) UV Curable Liquid Crystal Side Substrate First, the UV curable liquid crystal side substrate will be explained. The UV curable liquid crystal side substrate in the present invention comprises a first substrate, an electrode layer formed on the first substrate, a first alignment layer formed on the electrode layer, and a UV curable liquid crystal layer formed on the first alignment layer. Hereinafter, each configuration of such UV curable liquid crystal side substrate will be explained.

(i) UV Curable Liquid Crystal Layer

The UV curable liquid crystal layer used in the present invention is formed on the first alignment layer, with the UV curable liquid crystal fixed. The UV curable liquid crystal is aligned by the first alignment layer, and for example, the UV curable liquid crystal layer can be formed by polymerizing the UV curable liquid crystal by the ultraviolet ray irradiation, and fixing the aligned state. Accordingly, since the UV curable liquid crystal layer is provided by fixing the aligned state of the UV curable liquid crystal in the present invention, it can function as the alignment layer for aligning the ferroelectric liquid crystal. Moreover, since the UV curable liquid crystal is fixed, it is not affected by the temperature, or the like, and thus it is advantageous. Furthermore, since the UV curable liquid crystal has a structure relatively similar to that of the ferroelectric liquid crystal, the interaction with the ferroelectric liquid crystal is reinforced so that the ferroelectric liquid crystal alignment can be controlled more effectively than the case of using only the alignment layer.

As such UV curable liquid crystal, it is preferable that the UV curable liquid crystal shows a nematic phase. The nematic phase can allows the alignment control relatively easily among the liquid crystal phases.

Moreover, it is preferable that the UV curable liquid crystal has a polymerizable liquid crystal material. Accordingly, the aligned state of the UV curable liquid crystal can be fixed. As the polymerizable liquid crystal material, any of a polymerizable liquid crystal monomer, a polymerizable liquid crystal oligomer and a polymerizable liquid crystal polymer can be used, however, in the present invention, the polymerizable liquid crystal monomer can be used preferably. Compared with the other polymerizable liquid crystal materials, that is, a polymerizable liquid crystal oligomer and a polymerizable liquid crystal polymer, the polymerizable liquid crystal monomer can be aligned at a lower temperature and it has a high alignment sensitivity so that it can be aligned easily.

The above-mentioned polymerizable liquid crystal monomer is not particularly limited as long as it is a liquid crystal monomer having a polymerizable functional group. For example, a monoacrylate monomer, a diacrylate monomer, or the like can be presented. Moreover, these polymerizable liquid crystal monomers may be used alone or as a mixture of two or more kinds.

As the monoacrylate monomer, for example, the compounds represented by the below-mentioned formula can be presented:

[Chemical formula 3]

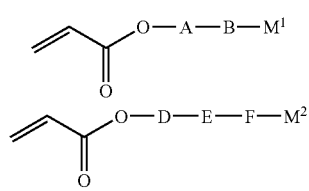

In the above-mentioned formula, A, B, D, E and F are a benzene, a cyclohexane or a pyrimidine, which may have a substituent group such as a halogen. Moreover, A and B, or D and E may be bonded via a bonding group such as an acetylene group, a methylene group and an ester group. $M^1$ and $M^2$ may be any of a hydrogen atom, an alkyl group having 3 to 9 carbon atoms, an alkoxy carbonyl group having 3 to 9 carbon atoms, or a cyano group. Furthermore, an acryloyloxy group on the molecular chain end and A or D may be bonded via a spacer such as an alkylene group having 3 to 6 carbon atoms.

Moreover, as the diacrylate monomer, for example, the compounds represented by the below-mentioned formula can be presented:

[Chemical formula 4]

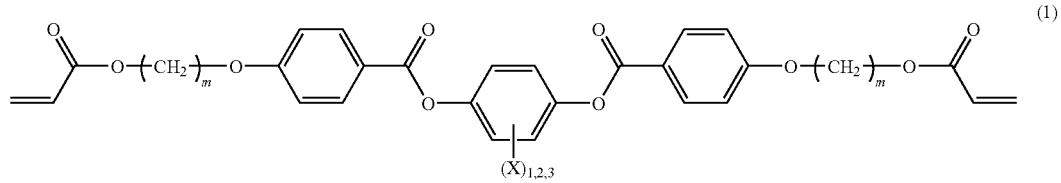

[Chemical formula 5]

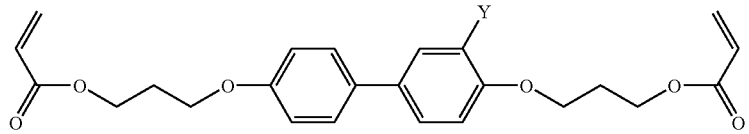

In the above-mentioned formula, X and Y is a hydrogen, alkyl having 1 to 20 carbon atoms, an alkenyl having 1 to 20 carbon atoms, an alkyloxy having 1 to 20 carbon atoms, an alkyloxy carbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro. m is an integer in a range of 2 to 20.

Furthermore, as the diacrylate monomer, for example, the compounds represented by the below-mentioned formula can also be presented:

[Chemical formula 6]

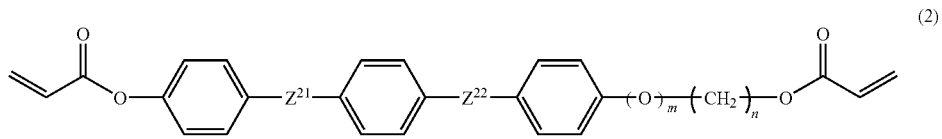

(2)

Here, $Z^{21}$ and $Z^{22}$ in the above formula are each independently directly bonded —COO—, —OCO—, —O—, —$CH_2CH_2$—, —CH=CH—, —C≡C—, —$OCH_2$—, —$CH_2O$—, —$CH_2CH_2COO$— or —$OCOCH_2CH_2$—. m is 0 or 1, and n is an integer in a range of 2 to 8.

In the present invention, in particular, the compounds represented by the above-mentioned formulae (1) and (2) can be used preferably. Moreover, in the case of the compounds represented by the above-mentioned formula (1), X is preferably an alkyloxy carbonyl having 1 to 20 carbon atoms, a methyl or a chlorine. In particular, it is preferably an alkyloxy carbonyl having 1 to 20 carbon atoms, and particularly preferably $CH_3(CH_2)_4OCO$.

The polymerizable liquid crystal monomer used in the present invention is preferably a diacrylate monomer among the above-mentioned examples. According to the diacrylate monomer, polymerization can be carried out easily while preferably maintaining the aligned state.

The above-mentioned polymerizable liquid crystal monomer may not show the nematic phase by itself. In the present invention, these polymerizable liquid crystal monomers may be used as a mixture of two or more kinds as mentioned above so that a composition mixture thereof, that is, a UV curable liquid crystal may show the nematic phase.

Furthermore, according to the present invention, as needed, a photo polymerization initiating agent or a polymerization inhibiting agent may be added to the above-mentioned UV curable liquid crystal. For example, at the time of polymerizing a polymerizable liquid crystal material by the electron beam irradiation, the photo polymerization initiating agent may not be needed, however, in the case of the polymerization used commonly by for example, the ultraviolet ray irradiation, in general a photo polymerization initiating agent is used for promoting the polymerization.

As the photo polymerization initiating agent to be used in the present invention, a benzyl (it is also referred to as a bibenzoyl), a benzoin isobutyl ether, a benzoin isopropyl ether, a benzophenone, a benzoyl benzoic acid, a methyl benzoyl benzoate, a 4-benzoyl-4'-methyl diphenyl sulfide, a benzyl methyl ketal, a dimethyl amino methyl benzoate, a 2-n-butoxy ethyl-4-dimethyl amino benzoate, a p-dimethyl amino isoamyl benzoate, a 3,3'-dimethyl-4-methoxy benzophenone, a methylobenzoyl formate, a 2-methyl-1-(4-(methyl thio) phenyl)-2-morpholino propane-1-on, a 2-benzyl-2-dimethyl amino-1-(4-morpholino phenyl)-butane-1-on, a 1-(4-dodecyl phenyl)-2-hydroxy-2-methyl propane-1-on, a 1-hydroxy cyclohexyl phenyl ketone, a 2-hydroxy-2-methyl-1-phenyl propane-1-on, a 1-(4-isopropyl phenyl)-2-hydroxy-2-methyl propane-1-on, a 2-chloro thioxantone, a 2,4-diethyl thioxantone, a 2,4-diisopropyl thioxantone, a 2,4-dimethyl thioxantone, an isopropyl thioxantone, a 1-chloro-4-propoxy thioxantone, or the like can be presented. In addition to the photopolymerization initiating agent, a sensitizing agent may be added within a range of not deteriorating the object of the present invention.

The addition amount of such a photo polymerization initiating agent is in general 0.01 to 20% by weight, preferably 0.1 to 10% by weight, and more preferably in a range of 0.5 to 5% by weight so as to be added to the above-mentioned UV curable liquid crystal.

The thickness of the UV curable liquid crystal layer used in the present invention is preferably in a range of 1 to 1,000 nm, and more preferably in a range of 3 to 100 nm. In the case the UV curable liquid crystal layer is thicker than the above-mentioned range, the anisotropy is generated excessively, and in the case it is thinner than the above-mentioned range, the predetermined anisotropy may not be obtained. Therefore, the thickness of the UV curable liquid crystal layer may be determined based on the needed anisotropy.

Next, the method for forming the UV curable liquid crystal layer will be explained. The UV curable liquid crystal layer can be formed by coating a UV curable liquid crystal layer coating solution including the above-mentioned UV curable liquid crystal onto the first alignment layer and applying the alignment treatment so as to fix the aligned state of the above-mentioned UV curable liquid crystal.

Moreover, a method of preliminarily forming a dry film, or the like and laminating the same onto the first alignment layer can also be used instead of coating the UV curable liquid crystal layer coating solution, however, in the present invention, it is preferable to use the method of preparing a UV curable liquid crystal coating solution by dissolving a UV curable liquid crystal in a solvent, coating the same on the first alignment layer and removing the solvent. This is because it is a method relatively simple in terms of the process.

The solvent used for the above-mentioned UV curable liquid crystal layer coating solution is not particularly limited as long as it can dissolve the above-mentioned UV curable liquid crystal, or the like without inhibiting the alignment ability of the first alignment layer. For example, one kind or tow or more kinds of hydrocarbons such as a benzene, a toluene, a xylene, an n-butyl benzene, a diethyl benzene and a tetralin; ethers such as a methoxy benzene, a 1,2-dimethoxy benzene and a diethylene glycol dimethyl ether; ketones such as an acetone, a methyl ethyl ketone, a methyl isobutyl ketone, a cyclohexanone and a 2,4-pentane dion; esters such as an ethyl acetate, a propylene glycol monomethyl ether acetate, a propylene glycol monoethyl ether acetate and a γ-butyrolactone; amide based solvents such as a 2-pyrolidone, an N-methyl-2-pyrolidone, a dimethyl formamide and a dimethyl acetamide; alcohols such as a t-butyl alcohol, a diacetone alcohol, a glycerol, a monoacetin, an ethylene glycol, a triethylene glycol and a hexylene glycol; phenols such as a phenol and a parachloro phenol; cellosolves such as a methyl cellosolve, an ethyl cellosolve, a butyl cellosolve and an ethylene glycol monomethyl ether acetate can be used.

Moreover, by using only one kind of a solvent, the solubility of the above-mentioned UV curable liquid crystal, or the like may be insufficient or the first alignment layer may be corroded as mentioned above. However, by using two or more kinds of the solvents as a mixture, the trouble can be avoided. Among the above-mentioned solvents, those preferable as a single solvent are the hydrocarbons and the glycol monoether acetate based solvents, and those preferable as a solvent mixture are a mixture of the ethers or the ketones and the glycol based solvents. Since the concentration of the UV curable liquid crystal layer coating solution depends on the solubility of the UV curable liquid crystal and the thickness of the UV curable liquid crystal layer to be formed, it cannot be defined on the whole, however, it is prepared in general in a range of 0.1 to 40% by weight, and preferably in a range of 1 to 20% by weight. In the case the concentration of the UV curable liquid crystal layer coating solution is lower than the above-mentioned range, the UV curable liquid crystal may hardly be aligned. On the other hand, in the case the concentration of the UV curable liquid crystal layer coating solution is higher than the above-mentioned range, since the viscosity of the UV curable liquid crystal layer coating solution becomes higher so that an even coating film may hardly be formed.

Furthermore, to the above-mentioned UV curable liquid crystal layer coating solution, the compounds as mentioned below can be added within a range of not deteriorating the purpose of the present invention. As the compounds to be added, for example, polyester (meth)acrylates obtained by reacting a polyester prepolymer obtained by the condensation of a polyhydric alcohol and a monobasic acid or a polybasic acid with a (meth)acrylic acid; polyurethane (meth)acrylates obtained by reacting a polyol group and a compound having two isocyanate groups with each other, and reacting the reaction product with a (meth)acrylic acid; photo polymerizable compounds such as an epoxy (meth)acrylate, obtained by reacting epoxy resins such as a bisphenol A type epoxy resin, a bisphenol F type epoxy resin, a novolak type epoxy resin, a polycarboxylic acid polyglycidyl ester, a polyol polyglycidyl ether, an aliphatic or alicyclic epoxy resin, an amine epoxy resin, a triphenol methane type epoxy resin and a dihydroxy benzene type epoxy resin with a (meth)acrylic acid; photo polymerizable liquid crystal compounds having an acrylic group or a methacrylic group, or the like can be presented. The addition amount of these compounds to the above-mentioned UV curable liquid crystal can be selected within a range of not deteriorating the purpose of the present invention. By adding these compounds, the hardening property of the UV curable liquid crystal can be improved so that the mechanical strength of the UV curable liquid crystal layer to be obtained can be increased and furthermore, the stability thereof can be improved.

AS a method for coating such a UV curable liquid crystal layer coating solution, a spin coating method, a roll coating method, a printing method, a dip coating method, a curtain coating method (die coating method), a casting method, a bar coating method, a blade coating method, a spray coating method, a gravure coating method, a reverse coating method, a extruding coating method, or the like can be presented.

Moreover, after coating the above-mentioned UV curable liquid crystal layer coating solution, the solvent is removed, and the solvent removal can be carried out for example by the reduced pressure removal, the heating removal, or furthermore, a method as a combination thereof.

According to the present invention, as mentioned above, the coated UV curable liquid crystal is aligned by the first alignment layer so as to be in a state having the liquid crystal regularity. That is, the UV curable liquid crystal comes to have the nematic phase. This is carried out in general by a method of the heat treatment to the N-I transition point or lower, or the like. Here, the "N-I transition point" denotes the temperature of the transition from the liquid crystal phase to the isotropic phase.

As mentioned above, the UV curable liquid crystal has a polymerizable liquid crystal material. In order to fix the aligned state of such a polymerizable liquid crystal material, a method of directing an activating radiation for activating the polymerization is used. The "activating radiation" here is the radiation having the ability of inducing the polymerization to the polymerizable liquid crystal material. As needed, a photo polymerization initiating agent may be included in the polymerizable liquid crystal material.

The activating radiation is not particularly limited as long as it is a radiation capable of polymerizing the polymerizable liquid crystal material. In general, from the viewpoint of the device easiness, or the like, an ultraviolet ray or a visible light beam is used. An irradiation beam having a wavelength of 150 to 500 nm, preferably 250 to 450 nm, further preferably 300 to 400 nm is used.

According to the present invention, a method of directing an ultraviolet ray as the activating radiation to a polymerizable liquid crystal material to have the radical polymerization by generating a radical by the photo polymerization initiating agent with an ultraviolet ray is a preferable method. Since the method of using an ultraviolet ray as the activating radiation is a technique already established, it can be applied easily to the present invention including the photo polymerization initiating agent.

As the light source of the irradiating light beam, a low pressure mercury lamp (a germicidal lamp, a fluorescent chemical lamp, a black light), a high pressure discharge lamp (a high pressure mercury lamp, a metal halide lamp), a short arc discharge lamp (an ultra high pressure mercury lamp, a xenon lamp, a mercury xenon lamp), or the like can be presented as the examples. In particular, use of a metal halide lamp, a xenon lamp, a high pressure mercury lamp, or the like can be recommended. Moreover, the irradiation strength is adjusted optionally according to the composition of the UV curable liquid crystal and the amount of the photo polymerization initiating agent.

The irradiation of such an activating radiation can be carried out by the temperature condition to have the above-mentioned polymerizable liquid crystal material in a liquid crystal phase, or at a temperature lower than the temperature to have the liquid crystal phase. The polymerizable liquid crystal material once had the liquid crystal phase would not have the sudden disturbance of the aligned state even in the case the temperature is lowered thereafter.

As a method for fixing the aligned state of the polymerizable liquid crystal material, in addition to the above-mentioned method of directing the activating radiation, a method of polymerizing the polymerizable liquid crystal material by heating can be used as well. As the UV curable liquid crystal used in this case, those with a polymerizable liquid crystal monomer contained in the UV curable liquid crystal thermally polymerized at the N-I transition point of the UV curable liquid crystal or lower are preferable.

(ii) First Alignment Layer

Next, the first alignment layer used in the present invention will be explained. The first alignment layer used in the present invention is not particularly limited as long as it can align the above-mentioned UV curable liquid crystal without posing the adverse effect at the time of fixing the aligned state of the above-mentioned UV curable liquid crystal. For example, those having the rubbing treatment, the photo alignment treatment, or the like applied can be used. In the present invention, it is preferable to use a photo alignment layer with the photo alignment treatment applied. Since the photo alignment treatment is a non contact alignment treatment, it is effective in that the quantitative alignment treatment can be controlled without generation of the static electricity or the dusts.

Since the constituent materials of the photo alignment layer, the photo alignment treatment method, or the like are to be mentioned for the second alignment layer of the counter substrate to be described later, explanation is omitted here.

(iii) First Substrate

Next, the first substrate used in the present invention will be explained. The first substrate used in the invention is not limited to any especial kind if the substrate can be generally used as a substrate of liquid crystal display. Preferred examples thereof include glass plates and plastic plates. The surface roughness (RSM value) of the first substrate is preferably 10 nm or less, more preferably 3 nm or less, even more preferably 1 nm or less. The surface roughness in the invention can be measured with an atomic force microscope (AFM).

(iv) Electrode Layer

Next, the electrode layer used in the present invention will be explained. The electrode layer used in the invention are not limited to any especial kind if the electrode layer are electrode layer which are generally used as electrode layers of liquid crystal displays. At least either the electrode layer of the UV curable liquid crystal layer side substrate or the counter substrate is preferably an electrode layer made of a transparent conductor. Preferred examples of the material of the transparent conductor include such as an indium oxide, a tin oxide, and an indium tin oxide (ITO). In the case of rendering the liquid crystal display of the invention liquid crystal display of an active matrix system using TFT elements, one of the electrode layers of the UV curable liquid crystal layer side substrate and the counter substrate is rendered a full-face common electrode made of the transparent conductor and the other is rendered an electrode in which x electrodes and y electrodes are arranged in a matrix form and a TFT element and a pixel electrode are arranged in a region surrounded by each of the x electrodes and each of the y electrodes. In this case, the difference between concave and convex portions of an electrode layer made of the pixel electrodes, the TFT elements, the x electrodes and the y electrodes is preferably 0.2 µm or less. If the difference between the concave and convex portions of the electrode layer is over 0.2 µm, alignment disturbance is easily generated.

About the above-mentioned electrode layer, a transparent electroconductive film can be formed on the above-mentioned first substrate by a vapor deposition method such as CVD, sputtering, or ion plating, and then this is patterned into a matrix form, whereby the x electrodes and the y electrodes can be obtained.

(2) Counter Substrate

Next, the counter substrate used in the present invention will be explained. The counter substrate in the present invention comprises a second substrate, an electrode layer formed on the second substrate, and a second alignment layer formed on the electrode layer. Hereinafter, the respective configurations of the counter substrate will be explained. As to the second substrate, those explained for the first substrate of the above-mentioned UV curable liquid crystal side substrate, and as to the electrode layer, those explained for the electrode layer of the above-mentioned UV curable liquid crystal side substrate can be used, thus explanation is omitted here.

(i) Second Alignment Layer

The second alignment layer used in the present invention is not particularly limited as long as it can align the ferroelectric liquid crystal. As such a second alignment layer, for example, those having the rubbing treatment, the photo alignment treatment, or the like applied can be used. In the present invention, it is preferable to use a photo alignment layer with the photo alignment treatment applied. Since the photo alignment treatment is a non contact alignment treatment, it is effective in that the quantitative alignment treatment can be controlled without generation of the static electricity or the dusts. Hereinafter, such a photo alignment layer will be explained.

(Photo Alignment Layer)

The photo alignment layer has the liquid crystal molecule on the film aligned by providing the anisotropy to a film obtained by directing a light beam with the polarization controlled to a substrate coated with the constituent materials of the photo alignment layer to be described later so as to generate the photo excitation reaction (decomposition, isomerization, dimerization).

The constituent material for the photo alignment layer used in the present invention is not particularly limited as long as it has the effect of aligning the ferroelectric liquid crystal by generating the photo excitation reaction by directing a light beam (photo aligning). Such a material can be roughly classified into a photo-isomerizable type, in which only the shape of the molecule thereof changes so that the alignment thereof can reversibly change, and a photoreactive type, in which the molecule itself changes.

Here, the photo-isomerization reaction denotes the phenomenon of changing a single compound to another isomer by the light irradiation. By the use of such a photo-isomerizable type material, stable isomers out of a plurality of isomers are increased by the light irradiation, and thereby the anisotropy can be provided easily to the photo alignment layer.

The photoreaction is not limited to any especial kind if the reaction can change the molecule itself by the light irradiation to supply anisotropy to the photoaligning of the photo alignment layer. Photo-dimerization reaction or photo-decomposition is more preferable since the supply of the anisotropy to the photo alignment layer becomes easier. The Photo-dimerization reaction is a reaction that two molecules are polymerized by radical polymerization of their reactive sites aligned in the direction of polarization through the light irradiation. This reaction makes it possible to stabilize the alignment in the polarization direction to give anisotropy to the photo alignment layer. On the other hand, the photo-decomposition is a reaction which decomposes a molecule chain of polyimide or the like which is aligned in the direction of polarization by the light irradiation. This reaction makes it possible to give anisotropy to the photo alignment layer in the state that the molecule chain aligned in the direction perpendicular to the polarization direction remains.

In the present invention, as the constituent material for the photo alignment layer mentioned above, in particular, it is preferable to use a photoreactive type material for providing an anisotropy to the photo alignment layer by generating a photo-dimerization reaction or a photo decomposition reaction.

The wavelength range of light which causes photo-excited reaction in the constituent materials of the photo alignment layer is preferably within the wavelength range of ultraviolet rays, that is, the range of 10 to 400 nm, more preferably within the range of 250 to 380 nm.

The photo-isomerization type material is not particularly limited as long as it is a material capable of providing an anisotropy to the photo alignment layer by the photo-isomerization reaction, however, it is preferable to include a photo-isomerization reactive-compound having the dichroism with different absorptions depending on the polarization direction, and capable of generating the photo-isomerization-reaction by the light irradiation. By generating the isomerization of the reactive site alignment to the polarizing direction of the photo-isomerization-reactive compound having such characteristics, an anisotropy can be provided easily to the above-mentioned photo alignment layer.

In the above-mentioned photo-isomerization reactive compound, it is preferable that the above-mentioned photo-isomerization reaction is a cis-trans isomerization reaction. This is because any one of the cis-isomer and the trans-isomer increases by the light irradiation, whereby anisotropy can be given to the photo alignment layer.

Examples of the photo-isomerization-reactive compound used in the present invention may be monomolecular compounds or polymerizable monomers polymerizable with light or heat. These should be appropriately selected in accordance with the kind of the used ferroelectric liquid crystal. It is preferable to use any one of the polymerizable monomers since the monomer gives anisotropy to the photo alignment layer by the light irradiation and subsequently the monomer is polymerized, whereby the anisotropy can be made stable. Of such polymerizable monomers, preferable is an acrylate monomer or methacrylate monomer since the monomer gives anisotropy to the photo alignment layer and subsequently the monomer can easily be polymerized in the state that the anisotropy is kept good.

Specific examples of such a photo-isomerization-reactive compound include compounds having a cis-trans isomerization-reactive skeleton, such as an azobenzene skeleton or a stilbene skeleton.

Of the above-mentioned photo-isomerization-reactive compounds of monomolecular compounds and polymerizable monomers as described above, any compound having in the molecule thereof an azobenzene skeleton is preferable as the photo-isomerization-reactive compound used in the present invention. This is because the azobenzene skeleton interacts highly with the liquid crystal molecules and is particularly suitable for the control of the alignment of the ferroelectric liquid crystal since the skeleton contains many $\pi$ electrons.

Moreover, the photoreactive material using the Photo-dimerization reaction is not limited to any especial kind if the material can give anisotropy to the photo alignment layer by photo-dimerization reaction. The material preferably comprises a photo-dimerization-reactive compound having a radical-polymerizable functional group and a dichroism having different absorptions depending on the polarization direction thereof. This is because the alignment of the photo-dimerization-reactive compound is stabilized and anisotropy can easily be given to the photo alignment layer by radical-polymerizing its reactive sites aligned in the polarization direction.

Examples of the photo-dimerization-reactive compound having such properties include dimerization-reactive polymers each having, as its side chain, at least one reactive site selected from a cinnamic acid ester, a coumalin, a quinoline, a chalcone group and a cinnamoyl group. Of these, the following is preferred as the photo-dimerization-reactive compound having such properties: a dimerization-reactive polymer having, as its side chain, any one of a cinnamic acid ester, a coumalin and a quinoline. This is because the compound is radical-polymerized in the state that the double bonds in the $\alpha,\beta$-unsaturated ketone aligned in the polarization direction function as reactive sites, whereby anisotropy can easily be given to the photo alignment layer.

The main chain of the dimerization-reactive polymer is not limited to any especial kind if the main chain is a chain that is generally known as a polymer main chain, and is preferably a chain which does not have a substituent containing many $\pi$ electrons, which hinder interactions between the reactive sites of the above-mentioned side chain, an example of the substituent being an aromatic hydrocarbon group.

Examples of the photoreactive material using the photo decomposition reaction include a polyimide "RN 1199" manufactured by NISSAN CHEMICAL INDUSTRIES, LTD . . . .

The constituting material of the photo alignment layer used in the present invention may contain additives as long as the photoaligning of the photo alignment layer is not hindered. Examples of the additives include a polymerization initiator and a polymerization inhibitor.

Next, the photo alignment treatment method will be explained. First, it can be carried out by coating a coating solution prepared by diluting the constituent materials of the above-mentioned photo alignment layer with an organic solvent onto the surface facing the liquid crystal layer of the second substrate provided with the electrode layer, and drying. In this case, the content of the photo-dimerization-reactive compound or photo-isomerization-reactive compound in the coating solution is preferably in a range of 0.05 to 10% by weight, and more preferably in a range of 0.2 to 2% by weight. In the case the content of the compound is smaller than the above-mentioned range, it is difficult to provide the appropriate anisotropy to the alignment layer. On the contrary, in the case it is larger than the above-mentioned range, a homogeneous coating film can hardly be formed due to the high viscosity of the coating solution.

The coating method which can be used is spin coating, roll coating, rod bar coating, spray coating, air knife coating, slot die coating, wire bar coating or the like.

The thickness of the film obtained by the coating with the constituent material is preferably from 1 to 1000 nm, more preferably from 3 to 100 nm. If the thickness of the film is smaller than the above-mentioned range, a sufficient photo-aligning may not be obtained. Conversely, if the thickness is larger than the above-mentioned range, it may be disadvantageous in terms of costs.

The resultant film causes photo-excited reaction by the light irradiation the polarization of which is controlled, whereby anisotropy can be given. The wavelength range of the radiated light should be appropriately selected in accordance with the constituent material of the used photo alignment layer, and is preferably the range of ultraviolet ray wavelengths, that is, the range of 100 to 400 nm, more preferably the range of 250 to 380 nm.

The direction of the polarization is not especially limited if the direction makes it possible to generate the photo-excited reaction, and is preferably in the range of 0 to 45° oblique to the substrate face, more preferably in the range of 20 to 45° oblique thereto for both of the first and second photo alignment layers since the aligned state of the ferroelectric liquid crystal can be made good.

Furthermore, in the case a polymerizable monomer is used as the constituent material for the photo alignment layer out of the above-mentioned photo-isomerization-reactive compounds, the anisotropy provided to the photo alignment layer can be stabilized by heating and polymerizing after carrying out the photo alignment treatment.

(ii) Second UV Curable Liquid Crystal Layer

According to the present invention, a second UV curable liquid crystal layer provided by fixing a UV curable liquid crystal may be formed on the above-mentioned second alignment layer. In this case, it is preferable that the UV curable liquid crystal comprising the UV curable liquid crystal layer of the above-mentioned UV curable liquid crystal side substrate has a composition different from that of the UV curable liquid crystal comprising the second UV curable liquid crystal layer of the counter substrate. As mentioned above, the UV curable liquid crystal can control the alignment of the ferroelectric liquid crystal more effectively than the case of using only the alignment layer. Moreover, since the UV curable liquid crystal comprising the above-mentioned UV curable liquid crystal layer and the UV curable liquid crystal comprising the above-mentioned second UV curable liquid crystal layer have different compositions, generation of the alignment defects such as the double domains can be restrained so that the mono domain alignment of the ferroelectric liquid crystal can be obtained.

The UV curable liquid crystal used in the second UV curable liquid crystal layer, the method for forming the second UV curable liquid crystal layer, or the like are same as those mentioned in the above-mentioned column of the "(1) UV curable liquid crystal side substrate (i) UV curable liquid crystal layer".

According to the present invention, by variously selecting the polymerizable functional group and the substituent group of the above-mentioned polymerizable monomer, the compositions of the UV curable liquid crystal comprising the above-mentioned UV curable liquid crystal layer and the UV curable liquid crystal comprising the above-mentioned second UV curable liquid crystal layer can be made different. In this case, the polymerizable functional groups of the polymerizable monomers used for the above-mentioned two UV curable liquid crystals may either be same or different. Moreover, according to the present invention, two or more kinds of the polymerizable monomers may be used in a combination, and by changing the combination, the composition can be varied. Furthermore, even in the case of using the same combination, by changing the content of the polymerizable monomer, respectively, composition can be made different.

(3) Liquid Crystal Layer

Next, the liquid crystal layer used in the present invention will be explained. The liquid crystal layer in the present invention comprises a ferroelectric liquid crystal being sandwiched between the above-mentioned UV curable liquid crystal layer and the above-mentioned second alignment layer. The ferroelectric liquid crystal used for the above-mentioned liquid crystal layer is not particularly limited as long as it can realize the chiral smectic C phase (SmC*), however, it is preferably a material with the phase change from the nematic phase (N)-cholesteric phase (Ch)-chiral smectic C phase (SmC*), or the nematic phase (N)-chiral smectic C phase (SmC*) without the smectic A phase (5 mA) in the phase sequence of the ferroelectric liquid crystal.

In the case of displaying the liquid crystal display of the invention by a field sequential color system, it is preferable to use a liquid crystal material having mono-stability and undergoing phase transition via no smectic A phase. The mono-stability herein means a nature that liquid crystal has only one stable state when no voltage is applied thereto, as described above. Particularly preferable is a ferroelectric liquid crystal undergoing half-V-shaped driving, in which liquid crystal molecules thereof work only when either one of positive and negative voltages is applied thereto since the liquid crystal makes it possible to lengthen the aperture time of a black and white shutter and realize bright full-color display.

Moreover, in the present invention, since the liquid crystal material having the mono-stability via no phase transition to the smectic A phase is used, it enables the drive by the active matrix system using a thin film transistor (TFT) and the gray scale control by the voltage modulation so as to realize the highly precise and high quality display.

The ferroelectric liquid crystal used in the invention is preferably one constituting a single phase. The word "constituting a single phase" means that a polymer network, as formed by the polymer stabilization method or the like, is not formed. Such use of the ferroelectric liquid crystal of a single phase produces an advantage that the production process becomes simple and the driving voltage can be made low.

The thickness of the liquid crystal layer made of the above-mentioned ferroelectric liquid crystal is preferably from 1.2 to 3.0 µm, more preferably from 1.3 to 2.5 µm, even more preferably from 1.4 to 2.0 µm. If the thickness of the liquid crystal layer is too thin, the contrast may lower. Conversely, if the thickness is too thick, the liquid crystal may not be aligned with ease.

As the method for forming the liquid crystal layer, a method commonly used as a method for manufacturing a liquid crystal cell can be used. For example, a liquid crystal layer can be formed by heating the above-mentioned ferroelectric liquid crystal in the liquid crystal cell preliminarily with the UV curable liquid crystal side substrate and the counter substrate produced so as to provide an isotropic liquid, and injecting the same utilizing the capillary effect, and sealing with an adhesive. The thickness of the above-mentioned liquid crystal layer can be adjusted with a spacer such as beads.

(4) Polarizing Plate

Next, the polarizing plate used in the present invention will be explained. The polarizing plate used in the invention is not limited to any especial kind if the plate is a member for transmitting only a specific direction of wave motions of light. It is possible to use members which are generally used as polarizing plates for liquid crystal displays.

2. Process for Producing a Liquid Crystal Display

Next, the process for producing a liquid crystal display of the present invention will be explained. As the process for producing a liquid crystal display of the present invention, the methods commonly known as the process for producing a liquid crystal display can be used. Hereinafter, as an example of the process for producing a liquid crystal display of the present invention, the case of producing a liquid crystal display of the active matrix system using the TFT element will be explained.

First, a transparent conductive film is formed on the first substrate by the above-mentioned deposition method so as to provide an entire surface common electrode. Furthermore, by coating a photo alignment layer material on the common electrode and applying the photo alignment treatment, a first alignment layer is formed. By coating a UV curable liquid crystal layer coating solution on the first alignment layer for aligning and fixing the UV curable liquid crystal, a UV curable liquid crystal layer is formed so as to provide a UV curable liquid crystal side substrate. Moreover, an x electrode and a y electrode are formed on the second substrate by patterning the transparent conductive film in a matrix form, and a switching element and a pixel electrode are installed. Furthermore, by coating a photo alignment layer material on the x electrode, the y electrode, the switching element and the pixel electrode and applying a photo alignment treatment, a second alignment layer is formed so as to provide a counter substrate. With beads sprinkled as a spacer on the second alignment layer of the counter substrate accordingly formed and a sealing agent coated on the circumference, the UV curable liquid crystal layer of the UV curable liquid crystal side substrate and the photo alignment layer of the counter substrate are attached facing each other and thermally pressed. Then, capillary effect is used to inject a ferroelectric liquid crystal, in an isotropic liquid state, from an injecting port thereinto, and then the injecting port is sealed with an ultraviolet curable resin or the like. Thereafter, the ferroelectric liquid crystal is slowly cooled, whereby the liquid crystal can be aligned. Polarizing plates are stuck onto the upper and the lower of the thus-obtained liquid crystal cell, whereby liquid crystal display of the present invention can be yield.

3. Application of the Liquid Crystal Display

Next, the application of the liquid crystal display of the present invention will be explained. It is preferable that the liquid crystal display of the present invention is driven by the active matrix system using a thin film transistor (TFT). By further using the color filter system or the field sequential color system, a color liquid crystal display can be provided. In the present invention, color display can be enabled by disposing a micro color filter on the TFT substrate side or the common electrode substrate side, however, by utilizing the high speed response property of the ferroelectric liquid crystal, color display by the field sequential color system can be enabled in combination with a LED light source without using a micro color filter. Moreover, since the liquid crystal display of the present invention can align the ferroelectric liquid crystal without generating the alignment defect, a highly precise color display with a wide view angle and a high speed response property can be realized.

It is preferred to display the liquid crystal display of the invention by the field sequential color system out of these for the following reason. As described above, the field sequential color system is a system in which each pixel is subjected to time sharing, and thus high-speed responsibility is particularly necessary in order to obtain a good movie display characteristic.

In this case, as the ferroelectric liquid crystal, it is preferable to use a material having the mono-stability characteristics of showing the chiral smectic C phase from the cholesteric phase without having the smectic A phase. Such a material has the inclination of the longer axis direction of the liquid crystal molecule at the time of applying a positive voltage and applying a negative voltage in the same direction so as to have the electro-optical characteristic with the light transmittance of the applied voltage provided unsymmetrically. The characteristic is referred to in this specification as the half-V shaped switching (HV-shaped switching). Since a material showing the HV-shaped switching is used, the opening time as a black and white shutter can be provided for a sufficiently long time. This makes it possible to display respective colors switched with time more brightly to realize bright full-color liquid crystal display.

In the case the above-mentioned ferroelectric liquid crystal shows the mono-stability, the liquid crystal display of the present invention is driven basically by the active matrix system using a TFT, however, it can also be driven by the segment system.

The present invention is not limited to the above-mentioned embodiments. The embodiments are examples, and all modifications having substantially the same structure and producing the same effects and advantages as the technical concept recited in the claims of the present invention are included in the technical scope of the invention.

EXAMPLES

Hereinafter, the present invention will be explained specifically with reference to the examples.

Example 1

A compound A represented by a below-mentioned formula I was used as the material for an alignment layer, and a compound B represented by a below-mentioned formula II was used as the liquid crystal material for the UV curable liquid crystal layer.

[Chemical formula 7]

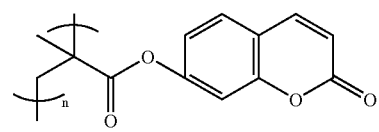

I

-continued

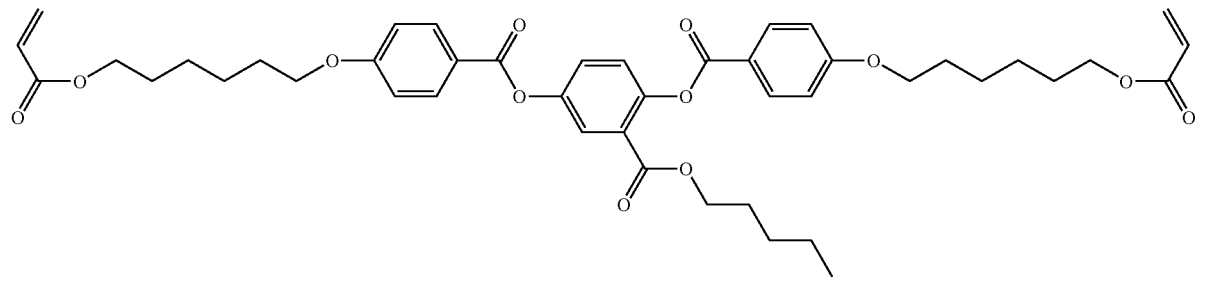

II

Two glass substrates with an ITO coating were spin coated with a 2% by weight solution of a compound A dissolved in a cyclopentanone for 30 seconds by a 4,000 rpm rotational frequency. After drying for 10 minutes at 180° C. in an oven, it was exposed by 100 mJ/cm² with a polarized ultraviolet ray at 25° C. by a 30° angle with respect to the substrate surface. Furthermore, one of the substrates was spin coated with a 2% by weight solution of a compound B dissolved in a cyclopentanone for 30 seconds by a 4,000 rpm rotational frequency for lamination. After drying for 3 minutes at 55° C., it was exposed by 1,000 mJ/cm² with a non polarized ultraviolet ray at 55° C. Thereafter, with a 1.5 μm spacer sprinkled on one of the glass substrates and a sealing material coated on the other substrate with a seal dispenser, the substrates were assembled in a direction parallel to the polarized ultraviolet ray irradiation direction in an anti parallel state, and thermally pressed. As the liquid crystal, "R2301" (manufactured by Clariant (Japan) K. K.) was used. With the liquid crystal adhered on the injection opening upper part, injection was carried out at a temperature higher than the nematic phase-isotropic phase transition temperature by 10° C. to 20° C. with an oven, then it was returned slowly to a room temperature so as to obtain a mono domain alignment without an alignment defect.

Example 2

A compound B represented by the above-mentioned formula II was used as the liquid crystal material for the UV curable liquid crystal layer.

Two glass substrates with an ITO coating were spin coated with polyimide "RN1199" manufactured by NISSAN CHEMICAL INDUSTRIES, LTD. for 30 seconds by a 4,000 rpm rotational frequency. After drying for 10 minutes at 180° C. in an oven, it was exposed by 100 mJ/cm² with a polarized ultraviolet ray at 25° C. Furthermore, one of the substrates was spin coated with a 2% by weight solution of a compound B dissolved in a cyclopentanone for 30 seconds by a 4,000 rpm rotational frequency for lamination. After drying for 3 minutes at 55° C., it was exposed by 1,000 mJ/cm² with a non polarized ultraviolet ray at 55° C. Thereafter, a cell was assembled by the above-mentioned method and a liquid crystal was injected thereto so as to obtain a mono domain alignment without an alignment defect.

Example 3

A compound A represented by the above-mentioned formula I was used as the material for an alignment layer, and a compound C represented by the above-mentioned formula III was used as the liquid crystal material for the UV curable liquid crystal layer.

[Chemical formula 8]

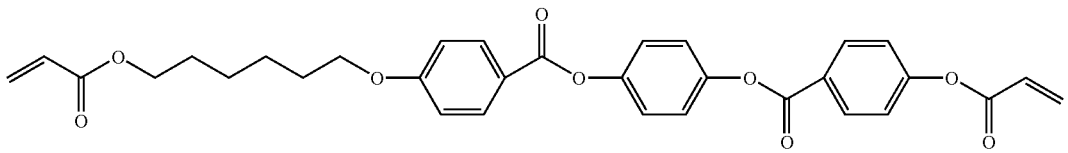

III

Two glass substrates with an ITO coating were spin coated with a 2% by weight solution of a compound A dissolved in a cyclopentanone for 30 seconds by a 4,000 rpm rotational frequency. After drying for 10 minutes at 180° C. in an oven, it was exposed by 100 mJ/cm² with a polarized ultraviolet ray at 25° C. by a 30° angle with respect to the substrate surface. Furthermore, one of the substrates was spin coated with a 2% by weight solution of a compound C dissolved in a cyclopentanone for 30 seconds by a 4,000 rpm rotational frequency for lamination. After drying for 3 minutes at 55° C., it was exposed by 1,000 mJ/cm² with a non polarized ultraviolet ray at 55° C. Thereafter, a cell was assembled by the above-mentioned method and a liquid crystal was injected thereto so as to obtain a mono domain alignment without an alignment defect.

Example 4

A compound C represented by the above-mentioned formula III was used as the liquid crystal material for the UV curable liquid crystal layer.

Two glass substrates with an ITO coating were spin coated with polyimide "RN1199" manufactured by NISSAN CHEMICAL INDUSTRIES, LTD. for 30 seconds by a 4,000 rpm rotational frequency. After drying for 10 minutes at 180° C. in an oven, it was exposed by 100 J/cm² with a polarized ultraviolet ray at 25° C. Furthermore, one of the substrates was spin coated with a 2% by weight solution of a compound C dissolved in a cyclopentanone for 30 seconds by a 4,000 rpm rotational frequency for lamination. After drying for 3 minutes at 55° C., it was exposed by 1,000 mJ/cm² with a non polarized ultraviolet ray at 55° C. Thereafter, a cell was assembled by the above-mentioned method and a liquid crystal was injected thereto so as to obtain a mono domain alignment without an alignment defect.

Example 5

A compound A represented by the above-mentioned formula I was used as the material for an alignment layer, and a compound B represented by the above-mentioned formula II and a compound C represented by the above-mentioned formula III were used as the liquid crystal material for the UV curable liquid crystal layer.

Two glass substrates with an ITO coating were spin coated with a 2% by weight solution of a compound A dissolved in a cyclopentanone for 30 seconds by a 4,000 rpm rotational frequency. After drying for 10 minutes at 18° C. in an oven, it was exposed by 100 mJ/cm² with a polarized ultraviolet ray at 25° C. by a 30° angle with respect to the substrate surface. Furthermore, one of the substrates was spin coated with a 2% by weight solution of a compound B dissolved in a cyclopentanone, and the other substrate with a 2% by weight solution of a compound C dissolved in a cyclopentanone for 30 seconds by a 4,000 rpm rotational frequency for lamination. After drying for 3 minutes at 55° C., it was exposed by 1,000 mJ/cm² with a non polarized ultraviolet ray at 55° C. Thereafter, a cell was assembled by the above-mentioned method and a liquid crystal was injected thereto so as to obtain a mono domain alignment without an alignment defect.

Comparative Example 1

A compound A represented by the above-mentioned formula I was used as the material for an alignment layer.

Two glass substrates with an ITO coating were spin coated with a 2% by weight solution of a compound A dissolved in a cyclopentanone for 30 seconds by a 4,000 rpm rotational frequency. Furthermore, a cell was assembled by the above-mentioned method and a liquid crystal was injected thereto so as to generate the alignment defects such as the double domains, the zigzag defect and the hairpin defect without obtaining a mono domain alignment.

Comparative Example 2

Two glass substrates with an ITO coating were spin coated with polyimide "RN1199" manufactured by NISSAN CHEMICAL INDUSTRIES, LTD. used as the material for an alignment layer for 30 seconds by a 4,000 rpm rotational frequency. After drying for 10 minutes at 180° C. in an oven, it was exposed by 100 J/cm² with a polarized ultraviolet ray at 25° C. Thereafter, a cell was assembled by the above-mentioned method and a liquid crystal was injected thereto so as to generate the alignment defects such as the double domains, the zigzag defect and the hairpin defect without obtaining a mono domain alignment.

The invention claimed is:

1. A liquid crystal display comprising:
   a UV curable liquid crystal side substrate having a first substrate, an electrode layer formed on the first substrate, a first alignment layer formed on the electrode layer, and a UV curable liquid crystal layer with a UV curable liquid crystal fixed and formed on the first alignment layer; and
   a counter substrate having a second substrate, an electrode layer formed on the second substrate, and a second alignment layer formed on the electrode layer,
   wherein the UV curable liquid crystal layer of the UV curable liquid crystal side substrate and the second alignment layer of the counter substrate are disposed so as to face each other such that a ferroelectric liquid crystal is sandwiched between the UV curable liquid crystal side substrate and the counter substrate.

2. The liquid crystal display according to claim 1, wherein a second UV curable liquid crystal layer with a UV curable liquid crystal fixed on the second alignment layer is formed, and the UV curable liquid crystal comprising the UV curable liquid crystal layer and the UV curable liquid crystal comprising the second UV curable liquid crystal layer are different compositions.

3. The liquid crystal display according to claim 1, wherein the UV curable liquid crystal shows a nematic phase.

4. The liquid crystal display according to claim 3, wherein the UV curable liquid crystal has a polymerizable liquid crystal monomer.

5. The liquid crystal display according to claim 4, wherein the polymerizable liquid crystal monomer is a monoacrylate monomer or a diacrylate monomer.

6. The liquid crystal display according to claim 5, wherein the diacrylate monomer is a compound represented by a below-mentioned formula (1):

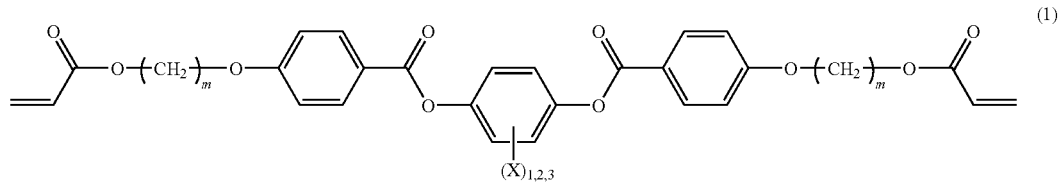

(Here, X in the formula is a hydrogen, an alkyl having 1 to 20 carbon atoms, an alkenyl having 1 to 20 carbon atoms, an alkyloxy having 1 to 20 carbon atoms, an alkyloxy carbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro; and m is an integer in a range of 2 to 20).

7. The liquid crystal display according to claim 5, wherein the diacrylate monomer is a compound represented by a below-mentioned formula (2):

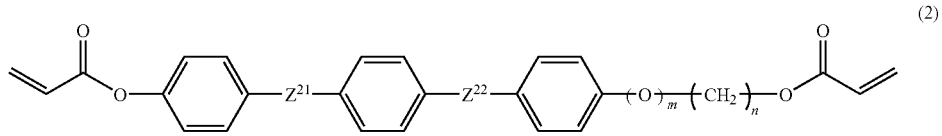

(2)

(Here, $Z^{21}$ and $Z^{22}$ in the formula are each independently directly bonded —COO—, —OCO—, —O—, —CH$_2$CH$_2$—, —CH=CH—, —OCH$_2$—, —CH$_2$O—, —CH$_2$CH$_2$COO— or —OCOCH$_2$CH$_2$—; m is 0 or 1; and n is an integer in a range of 2 to 8).

8. The liquid crystal display according to claim 1, wherein the first alignment layer and the second alignment layer are a photo alignment layer respectively.

9. The liquid crystal display according to claim 2, wherein the first alignment layer and the second alignment layer are a photo alignment layer respectively.

10. The liquid crystal display according to claim 1, wherein the ferroelectric liquid crystal shows mono-stability.

11. The liquid crystal display according to claim 2, wherein the ferroelectric liquid crystal shows mono-stability.

12. The liquid crystal display according to claim 8, wherein the ferroelectric liquid crystal shows mono-stability.

13. The liquid crystal display according to claim 10, wherein the ferroelectric liquid crystal does not have a smectic A phase in its phase sequence.

14. The liquid crystal display according to claim 11, wherein the ferroelectric liquid crystal does not have a smectic A phase in its phase sequence.

15. The liquid crystal display according to claim 12, wherein the ferroelectric liquid crystal does not have a smectic A phase in its phase sequence.

16. The liquid crystal display according to claim 1, wherein the ferroelectric liquid crystal comprises a single phase.

17. The liquid crystal display according to claim 2, wherein the ferroelectric liquid crystal comprises a single phase.

18. The liquid crystal display according to claim 1, wherein the liquid crystal display is driven by an active matrix system using a thin film transistor.

19. The liquid crystal display according to claim 1, wherein the liquid crystal display is displayed by a field sequential color system.

* * * * *